United States Patent [19]
Alfred et al.

[11] Patent Number: 5,894,504
[45] Date of Patent: Apr. 13, 1999

[54] ADVANCED CALL WAITING AND MESSAGING SYSTEM

[75] Inventors: Joseph Anderson Alfred, Somerset; Allen Eisdorfer, Woodbridge; Jerry Eisdorfer, Somerset; Christopher Gregory Harrington, Morris Township, Morris County, all of N.J.

[73] Assignee: AT&T, Middletown, N.J.

[21] Appl. No.: 08/733,245

[22] Filed: Oct. 2, 1996

[51] Int. Cl.$^6$ .................................................. H04M 1/64
[52] U.S. Cl. ............................... 379/88.13; 379/215
[58] Field of Search ............................ 379/67, 88, 89, 379/215, 67.1, 88.13, 88.19, 88.21, 88.26

[56] References Cited

U.S. PATENT DOCUMENTS

| | | | |
|---|---|---|---|
| 5,007,076 | 4/1991 | Blakley | 379/88 |
| 5,471,519 | 11/1995 | Howe et al. | 379/88 |
| 5,530,740 | 6/1996 | Irribarren et al. | 379/89 |
| 5,546,447 | 8/1996 | Sharba et al. | 379/93.23 |
| 5,712,902 | 1/1998 | Florence et al. | 379/89 |

OTHER PUBLICATIONS

AT&T Technical Journal, vol. 64, No. 6, part 2, pp. 1305–1314, Jul./Aug. 1985, "The 5ESS Switching System" by K. E. Martersteck, et al.

BellCore Technical Reference (TR–NWT–001273), Issue 1, Dec. 1992, "Generic Requirements for an SPCS to Customer Premises Equipment Data Interface for Analog Display Services".

AT&T Technical Journal, vol. 65, No. 6, Issue 1, pp. 1–16, Jan./Feb. 1986, the Table of Contents and the first article "ISDN Architecture"by R. T. Roca.

AT&T Technical Journal, vol. 65, Issue 5, pp. 34–45, Sep./Oct. 1986, "Conversant 1 Voice System, Architecture and Application" by R. J. Perdue, et al.

*Primary Examiner*—Fan S. Tsang

[57] ABSTRACT

A communications system is designed to allow a call waiting subscriber who is already busy on a first call to receive information associated with a message being recorded by a second caller attempting to reach the subscriber. According to one aspect of the principles disclosed herein, a one-way conference call is established between the second caller and the subscriber as the message is being recorded to allow the subscriber to eavesdrop on the message. According to another aspect of the principles disclosed herein, an Automatic Speech Recognition system may transcribe the message being recorded into ASCII coded data that is delivered to the called party. The received message allows the subscriber to effectively assess whether the first call in progress should be interrupted to answer the second call in waiting.

7 Claims, 5 Drawing Sheets

5,894,504

ADVANCED CALL WAITING AND MESSAGING SYSTEM

TECHNICAL FIELD

This disclosure relates to communications systems and, more particularly, to an improved method for processing calls and delivering information associated with a call-in-waiting to communications services subscribers.

BACKGROUND

Voice messaging and call waiting are well known communications services features that have enjoyed tremendous commercial success in the marketplace. Voice messaging allows a caller to record a message for an unavailable called party. By contrast, call waiting permits a called party who is already busy on a first call, to be informed that another call is waiting. The benefits of call waiting are not without some inconveniences. For example, call waiting subscribers quite often resent having to interrupt a conversation with a first party to answer a less important, if not a nuisance second call in waiting. Yet, the presumption of importance of the second call in waiting sometimes compels a called party to interrupt a first call to answer that second call. Too often the presumption is rebutted when the called party finds out—to his or her chagrin —, that the second call is an unimportant or a nuisance call.

In response to this problem, network designers have developed communications features, such as call screening or caller-identification to screen incoming calls based on a caller's telephone number or to provide identification information of a calling party to a called party. While those features sometimes assist a subscriber in deciding whether to interrupt a current call in progress to answer a second call in waiting, they represent an inadequate solution to the problem at hand for certain types of calls. For example, the caller identification feature does not help a called party to ascertain the identity of a caller who initiates a call from an originating point other than the caller's personal telephone number(s). This is because the identification information displayed to the called party does not allow the called party to associate the identification information to a particular person. Similarly, the call screening feature would typically cause calls initiated from unknown originating points, such as public telephone sets, to be blocked regardless of the importance of the call. The problem of identifying a calling party and/or the importance of a call in waiting is further complicated by the fact that even when a called party is able to associate the identification information with a particular caller, the called party does not know whether the nature of the call in waiting warrants interruption of a first call in progress.

In an attempt to find a solution to this problem, some subscribers use their answering machines as a screening device for incoming calls. In essence, the subscriber would interrupt the recording of a message to answer a call only if the content of the message identifies a caller to whom the subscriber wishes to communicate regarding a subject of mutual interest. As is well known in the art, the operations of an answering machine, e.g., delivery of a greeting announcement and recording of a message, are triggered when the machine receives at least one ringing tone signal from a central office switch. Unfortunately, when a call waiting subscriber is already engaged in a first call, the subscriber's answering machine does not receive the appropriate ringing tone signal to trigger the operations of the subscriber's answering machine.

SUMMARY

The present disclosure is directed to a method and a system that is implemented by a communications services provider to deliver to a call-waiting subscriber who is already busy on a first call, information associated with a message that is contemporaneously being recorded on a messaging system by a second caller attempting to reach the subscriber. The received information allows the subscriber to effectively assess the importance of the second call in waiting, thereby allowing the subscriber to make an intelligent decision as to whether the first call in progress should be interrupted to answer the second call in waiting.

In an exemplary embodiment of the principles disclosed herein, a switching system is arranged to transmit to a messaging system signaling information indicative of reception of a waiting call destined for a party already busy on a first call. Upon receiving the signaling information, the messaging system delivers a greeting announcement inviting the caller-in-waiting to record a message for the called party. If the caller decides to leave a message for the called party, the switching system establishes a three-way conference call between the caller-in-waiting, the messaging system while it is recording the caller's message, and the called party to allow the called party to eavesdrop on the message being recorded. Upon detecting a flash hook signal indicative of the called party's willingness to answer the second call in waiting, the switching system signals the voice messaging system to terminate the recording and to drop out of the connection.

Alternatively, the voice messaging system may include an automatic speech recognition unit that receives speech signals associated with a message being recorded by a caller. The automatic speech recognition unit transcribes in real time the input speech signals into text data that is delivered to the called party for display on a screen. When the call in waiting is destined for a Plain Old Telephone Service (POTS) device, the switching system may use the Analog Display Services Interface (ADSI) protocol to deliver the text data to the POTS end-user device. For an ISDN-compatible end-user device, the switching system may deliver the text data thereto via the data channel of the Basic Rate Interface (BRI). The voice messaging system automatically terminates the recording and the speech-to-text conversion of the message upon receiving from the switching system a signal indicative of the called party's willingness to answer the second call in waiting.

For multimedia applications, a picture of the caller, or the video component of the message may be delivered to the called party along with the audio component of the message being recorded.

DETAILED DESCRIPTION

Figure 1:
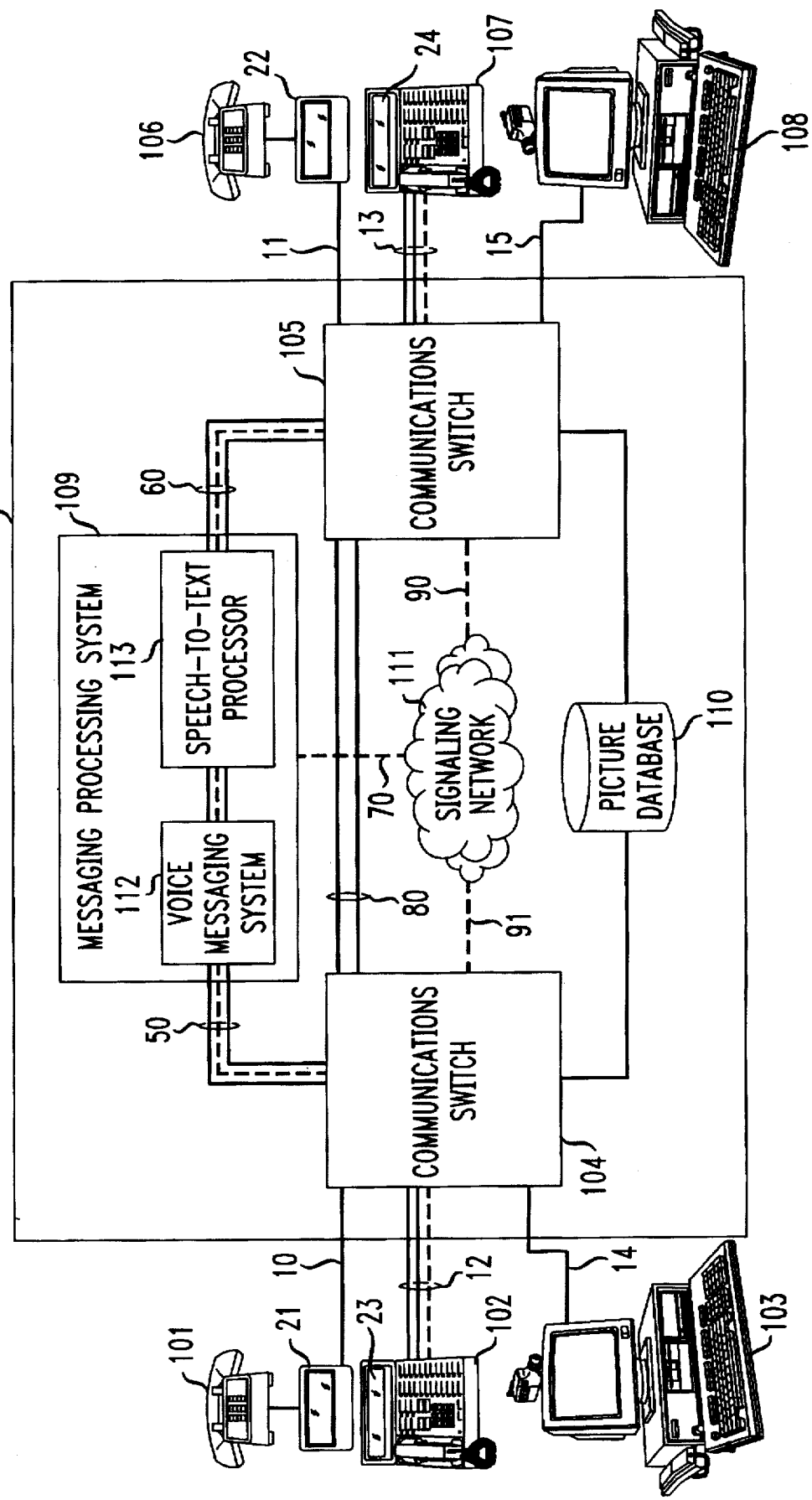
FIGS. 1 and 2 show in block diagram format communications switching systems arranged to deliver information associated with calls in waiting to communications services users.

FIG. 1 shows in block diagram format a communications switching system 100 which includes access/egress communications switches 104 and 105 that are connected to a common messaging complex 109. Switches 104 and 105 are also connected to a common picture database 110 that stores bit-mapped files of pictures of one or more members of a family associated with telephone numbers of digital end-user terminals 102, 107, 103 and 108. Switches 104 and 105 are processor-controlled, software-driven communications systems that are arranged to route calls to destinations specified in call setup information received from end-user devices such as analog telephone sets 101 and 106, ISDN telephone sets 102 and 107 and multimedia terminals 103 and 108. A well-known communications switch is the Lucent Technologies 5ESS® switch whose features and functionality are described in AT&T Technical Journal, Vol. 64, No. 6, part 2, pp. 1305–1564, July/August, 1985. Alternatively, an Asynchronous Transfer Mode (ATM) communication switch may be used for multimedia applications. Switches 104 and 105 communicate with respective analog end-user devices, such as telephone sets 101 and 106 via physical interfaces which include analog ports and POTS facilities, such as respective lines 10 and 11. Other physical interfaces of switches 104 and 105 include digital ports via which these switches transmit signals to respective digital facilities 12 and 13 for communications to respective ISDN telephone sets 102 and 107. Digital facilities 12 and 13 are Basic Rate Interface (BRI) loops which include two bearer (B) channels and one data (D) channel that carries signaling information for the bearer channels. When switches 104 and 105 serve a Community Antenna for Television (CATV) cable distribution system, multimedia terminals such as sets 103 and 108 may be connected to the switch via coaxial cables 14 and 15 that serve as conduits for multiplexed data, voice and video signals via one or more logical channels. Alternatively, lines 14 and 15 may be High Speed Digital Subscriber Loops (HDSL) or Asymmetric Digital Subscriber Loops (ADSL) that connect multimedia terminals 103 and 108 to switches 104 and 105, respectively.

Switches 104 and 105 are provisioned to support some Business and Residence Custom Services (BRCS) features, such as voice messaging service and caller identification that are subscribed to by the users of analog telephone sets 101 and 106, ISDN telephone sets 102 and 107 and multimedia terminals 103 and 108. As is well known in the art, caller identification service, commonly called "caller-id" for short, allows an end-user device to receive a calling party telephone number (or other identification information of the calling party) for an incoming call destined for that end-user device. When an incoming call is destined for analog telephone set 101 (106), switch 104 (105) delivers the originating telephone number associated with the call between the first ring and the second ring. That information appears on a screen of display unit 21 (22), which is arranged, inter alia, to display and store caller-id numbers of incoming calls. Of particular significance among the features of display unit 21 (22) is its support of the Analog Display Service Interface (ADSI) protocol which allows display unit 21 (22) to receive signaling information and other data even when telephone set 101 (102) is off-hook. As is well known in the art, the ADSI standards allow a central office switch, such as switches 104 and 105 to send limited amount of data, such as signaling information, to an analog telephone set regardless of the on-hook or off-hook state of the telephone set. Further information on the ADSI standards can be found in "Generic Requirements for an SPCS to Customer Premises Equipment Data Interface for Analog Display Services" BellCore Technical Reference (TR-NWT-001273), Issue 1, December 1992.

Switches 104 and 105 are also arranged to forward caller-id and other signaling information to digital telephone set 103 (104) via the D channel (indicated by the broken line) of ISDN loop 12 (13). The forwarded signaling information received by ISDN telephone set 103 (104) is displayed on screen 23 (24) of that set. Similarly, signaling information may be forwarded to multimedia terminal 103 (108) via a logical data channel of facility 14 (15) when switches 104 and 105 either serve a CATV cable distribution system or when facility 14 (15) supports HDSL or ADSL protocol.

Also shown in FIG. 1 is messaging processing system 109 that is comprised of voice messaging system 112 and Speech-to-Text processor 113. Messaging processing system 109 is connected to switches 104 and 105 via respective ISDN Primary Rate Interface (PRI) trunks 50 and 51. As is well known in the art, one of the key attributes of the ISDN PRI standard is the support for twenty-four 64 Kilobits per second (Kbps) channels over a standard DS-1 facility. Of particular importance is the portion of the standard requiring the use of 23 of those channels—called bearer (B) channels—to carry voice or data information and one common channel—called data (D) channel—to exclusively carry signaling information for the other 23 channels. In the present system, the D channel is used, for example, to carry signaling information associated with a call, such as calling and called party numbers, or supervisory signals, such as flash hook and terminating signals. Additional information regarding ISDN standards in general, and PRI interface in particular, can be found in AT&T Technical Journal, Vol. 65, No. 6, Issue 1, pp. 1–55 January/February 1986.

Voice messaging system 112 includes a call processing unit that is arranged to execute a set of scripts stored therein to answer an incoming call and to greet a caller with a pre-recorded voice announcement inviting the caller to leave a message for a called party. A voice messaging system may be implemented using the AT&T Intuity® Voice System whose architecture and features are described in AT&T Technical Journal Vol. 65, Issue 5, pp. 34–47, Sept/Oct. 1986. When switch 104 (105) completes a call to a called party, switch 104 (105) listens to terminating supervisory signals or call progress tones (busy, ring-no-answer) in order to take specific actions based on the type of signal received. For example, when switch 104 (105) detects a signal such as a ring-no-answer signal, switch 104 (105) infers that the called party is unavailable. If the called party is a voice messaging subscriber, switch 104 (105) transfers the call to voice messaging system 112 which delivers an announcement to the caller inviting him or her to leave a message for the called party. It is worth noting that although FIG. 1 shows messaging processing system 109 being connected to both communications switches 104 and 105, it is to be understood that messaging processing system 109 needs to be connected only to a terminating switch for the inventive principles of this disclosure to be implemented.

Messaging processing system 109 also includes a speech-to-text processor 113 which is arranged to convert speech signals received from voice messaging system 112 to text data that may illustratively be in ASCII code format. Speech-to-Text processor 113 may be implemented using a general purpose computer executing speech recognition system software, such as WATSON from AT&T or Dragon Dictate from Dragon Systems, Inc. of Newton, Mass. The speech recognition software is designed to convert speech signals from a limited set of languages into text data. A user may select a particular language by providing a selected code to speech-to-text processor 113.

Optionally, messaging processing system 109 may be a multimedia messaging system that is arranged to record an audio and video message for an unavailable called party. An implementation of a multimedia messaging is described in U.S. Pat. No. 5,524,110 which is incorporated herein by reference.

Communications switches 104 and 105 exchange call processing messages via signaling trunks 90 and 91 and a signaling network 111 which is comprised of a plurality of interconnected packet switching nodes that route call processing messages to their appropriate destinations according to a defined protocol, such as the well-known Common Channel Signaling (CCS) protocol. Trunk 80 carries telephone traffic other than signaling information between switches 104 and 105. Communications switch 104 (105) also includes internal tables that correlate a subscriber's telephone number to features subscribed to by the subscriber as well as the type of facility serving the subscriber.

It is worth noting that although the communications system 100 of FIG. 1 does not show (for the sake of simplicity) any toll switches or Inter-exchange carrier network, it is to be understood that one or more toll switches may be included in communications system 100.

Figure 2:
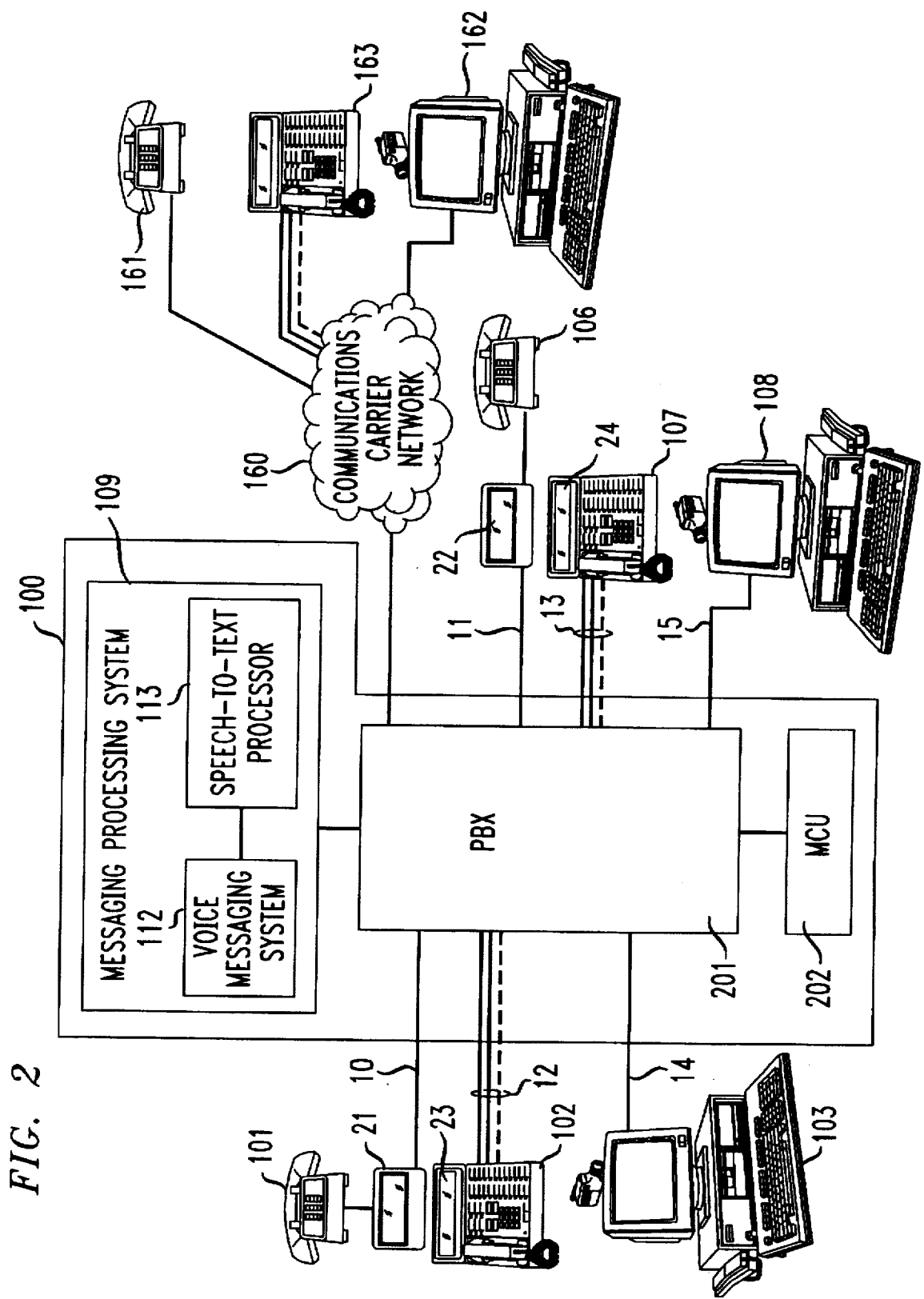

Alternatively, communications switching system 100 of FIG. 1 may be replaced with the PBX 201 of FIG. 2 which illustrates a switching system arranged to implement a premises version of the principles of the system disclosed herein. PBX 201 is a premises switching system, such as the Lucent Technologies Definity® System that is arranged to either switch internal calls between sets 101, 102, 103, 106, 107 and 108 at a particular location, or to direct calls for processing to carrier communications network 160 that completes calls to set 161, 162 or 163 based on the telephone number indicated in the call setup information. When PBX 201 is provisioned to support switched digital data services, multimedia communications may be provided to suitable end points, such as digital terminals 102, 103, 107 and 108 via Multimedia Conferencing Unit (MCU) 202 that is connected to PBX 201. MCU 202 provides an integrated video, data and audio conferencing solution that permits a caller with a suitable video end-user device such as ISDN videophone set 162 or multimedia terminal 163 to record an audio and video message for an unavailable called party.

Optionally, communications switching system 100 of FIG. 1 may be replaced with a computer network (not shown) that is comprised of interconnected processing nodes (including a messaging complex) arranged to a) switch digital signals according to a common addressing protocol, such as the Internet Protocol (IP), and b) to deliver messaging information to callers in-waiting.

Figure 3:
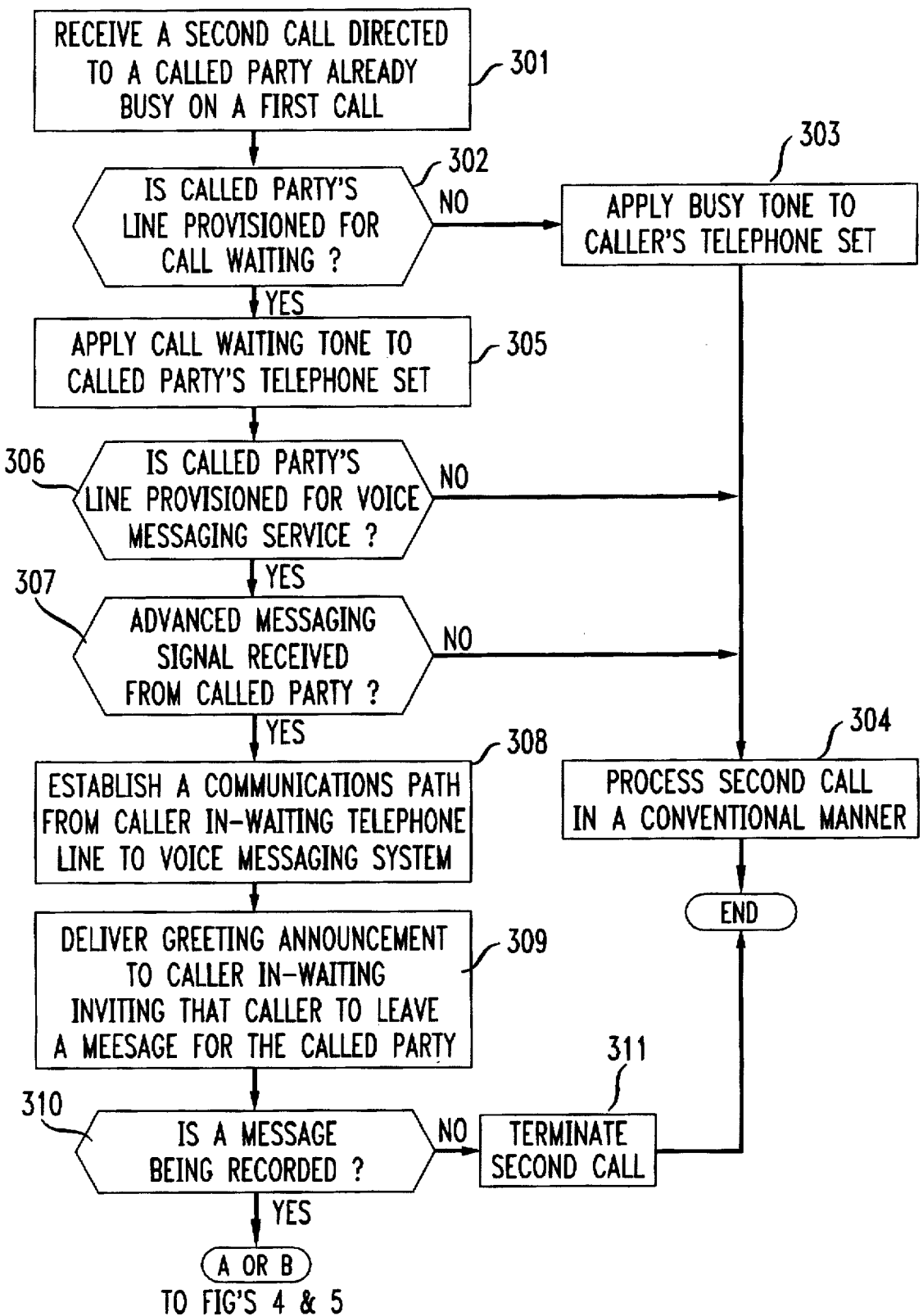
FIGS. 3 and 4 and 5 are illustrative programmed instructions executed by different components of FIGS. 1 and 2 to transmit messaging information associated with calls in waiting to communications services users.

FIG. 3 shows illustrative programmed instructions executed by different components of FIGS. 1 and 2 to transmit messaging information associated with calls in waiting to communications services users. The process contemplated by the system disclosed herein is initiated in step 301, when a communications switch, such as switch 105, for example, receives a signal indicating that a second call needs to be completed to a called party at telephone set 106, for example. When the signal is received by switch 105 at a time during which, the called party is already busy handling a first call, communications switch 105 consults its internal tables to inquire, in step 302, whether line 11 is provisioned for call waiting. If the internal tables of switch 105 indicate that line 11 is not provisioned for call waiting, switch 105 sends a message to communications switch 104 via signaling network 111 to apply a busy tone to the caller's end-user device, e.g., telephone set 101 in this example. Thereafter the second call is processed in a conventional manner, as indicated in step 304. When line 11 is provisioned for call waiting, as determined in step 302, a call waiting tone is applied to telephone set 106.

It is worth noting that the caller's telephone number or other identification information, such as the subscriber's name may be displayed on screen 22 if line 11 is provisioned for the caller identification feature. When the second call in waiting is directed to ISDN telephone set 107, for example, the caller identification information is forwarded to ISDN telephone set 107 via the Data (D) channel of the Basic Rate Interface (BRI) of physical line 13. Similarly, a logical data channel of physical interface 15 carries caller identification information to multimedia terminal 108 for calls directed thereto. When the second call is a multimedia call directed to digital end-user device 107 or multimedia terminal 108, the caller identification information may take the form of bit-mapped files of pictures of one or more members of a family associated with the originating telephone number.

Communications switch 105 also consults its internal tables to determine in step 306 whether line 11 is provisioned for voice messaging service. When the internal table reveals that line 11 is not provisioned for voice messaging service, the second call-in-waiting is processed in a conventional manner, as indicated in step 304. If line 11 is provisioned for voice messaging service, communications switch 105 further determines in step 307 whether any advanced messaging signal is received from telephone set 106. The aforementioned advanced messaging signal may take the form of a code such as *33, for example, that is entered by a called party who wishes to receive advanced messaging service. Different codes may be entered to receive different forms of the advanced messaging service. For example, a called party may enter *44 if the called party wants the speech-to-text processor 113 to convert the speech signals into French text data. Similarly, a called party may enter *55 if the called party wishes to listen to the messages as it is being recorded. When no advanced messaging signal is received from the called party, the second call-in-waiting is processed in a conventional manner. When communications switch 105 receives an advanced messaging signal from telephone set 106, as determined in step 307, communications switch 105, in step 308, establishes a communications path from the end-user device of the caller to voice messaging system 112. The latter proceeds in step 309 to deliver a greeting announcement to the caller inviting him or her to leave a message for the called party. When the caller opts to forego the opportunity to leave a message for the called party, as determined in step 310, communications switch 105, in step 311, transmits a signal to communications switch 104 to terminate the call.

Figure 4:
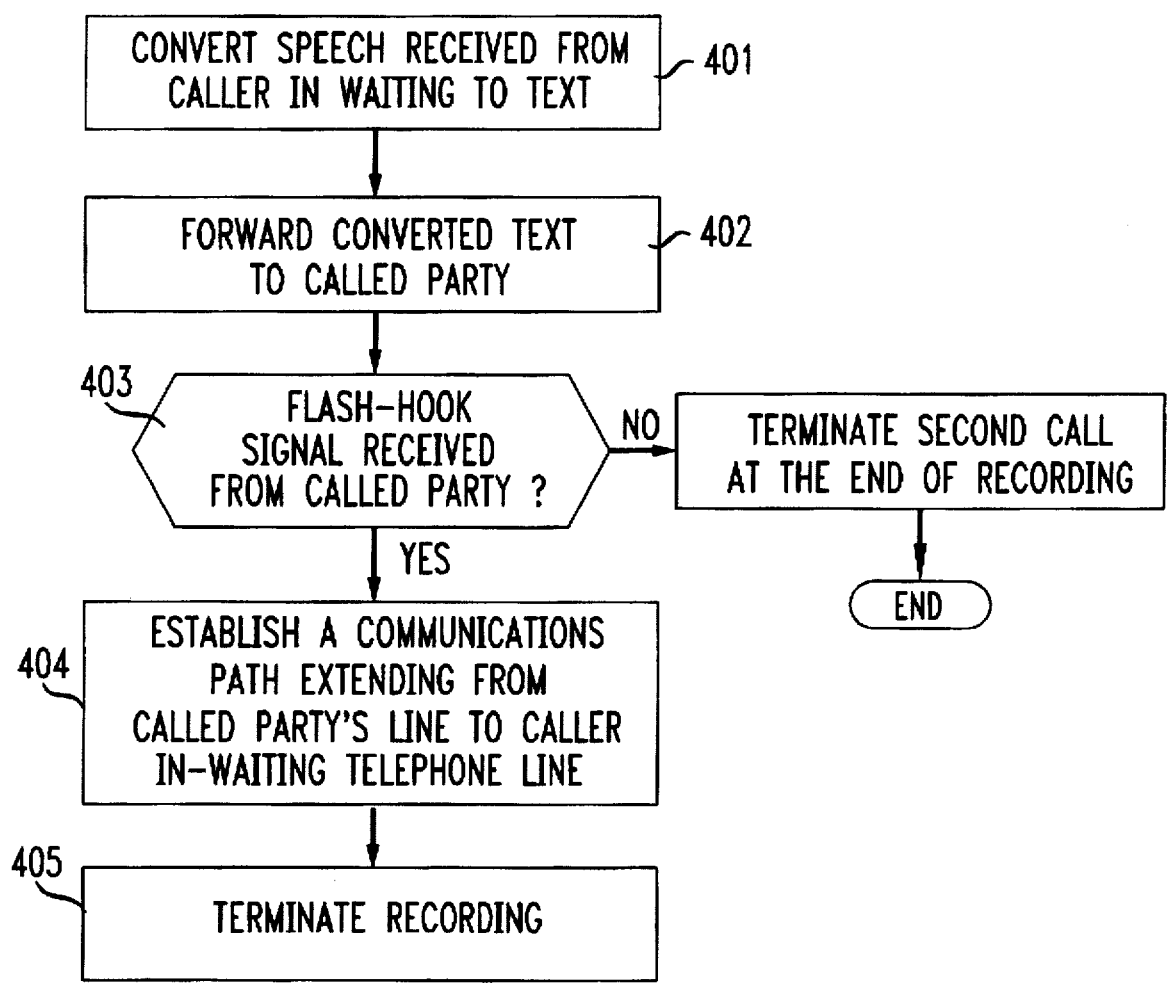

FIG. 4 shows in flow diagram format processing instructions that are executed by some of the components of FIG. 1 or 2 to implement the principles of the inventive concept disclosed herein. When voice messaging system 112 records a message from a caller, the speech signals of the message are forwarded to Speech-to-Text processor 113 which converts preferably in real time, the speech signals received from the caller to text data which are in turn transmitted to communications switch 105, as indicated in step 401. Communications switch 105, in step 402, uses the (ADSI) protocol to deliver the converted text data to telephone set 106 for display on screen 22. When the second call-in-waiting is destined for ISDN telephone set 107, communications switch 105 delivers the converted text data to that telephone set via the data channel of the basic rate interface of physical facility 13. Advantageously, the display of the text data associated with the message being recorded allows the called party to review that message and to assess the importance of the second call-in-waiting.

If a flash-hook signal is received from telephone set 11, as determined in step 403, communications switch 105, in step 304, establishes a communications path that extends from the caller's telephone set to the called party's telephone set, as indicated in step 404. Thereafter, communications switch 105 sends a signal to messaging processing system 113 to terminate the recording of the message. As is well known in the art, a flash-hook signal is typically generated by a called party who wishes to communicate with a caller-in-waiting. If no flash-hook signal is received from the called party, the second call-in-waiting is automatically terminated at the end of the recording.

Figure 5:
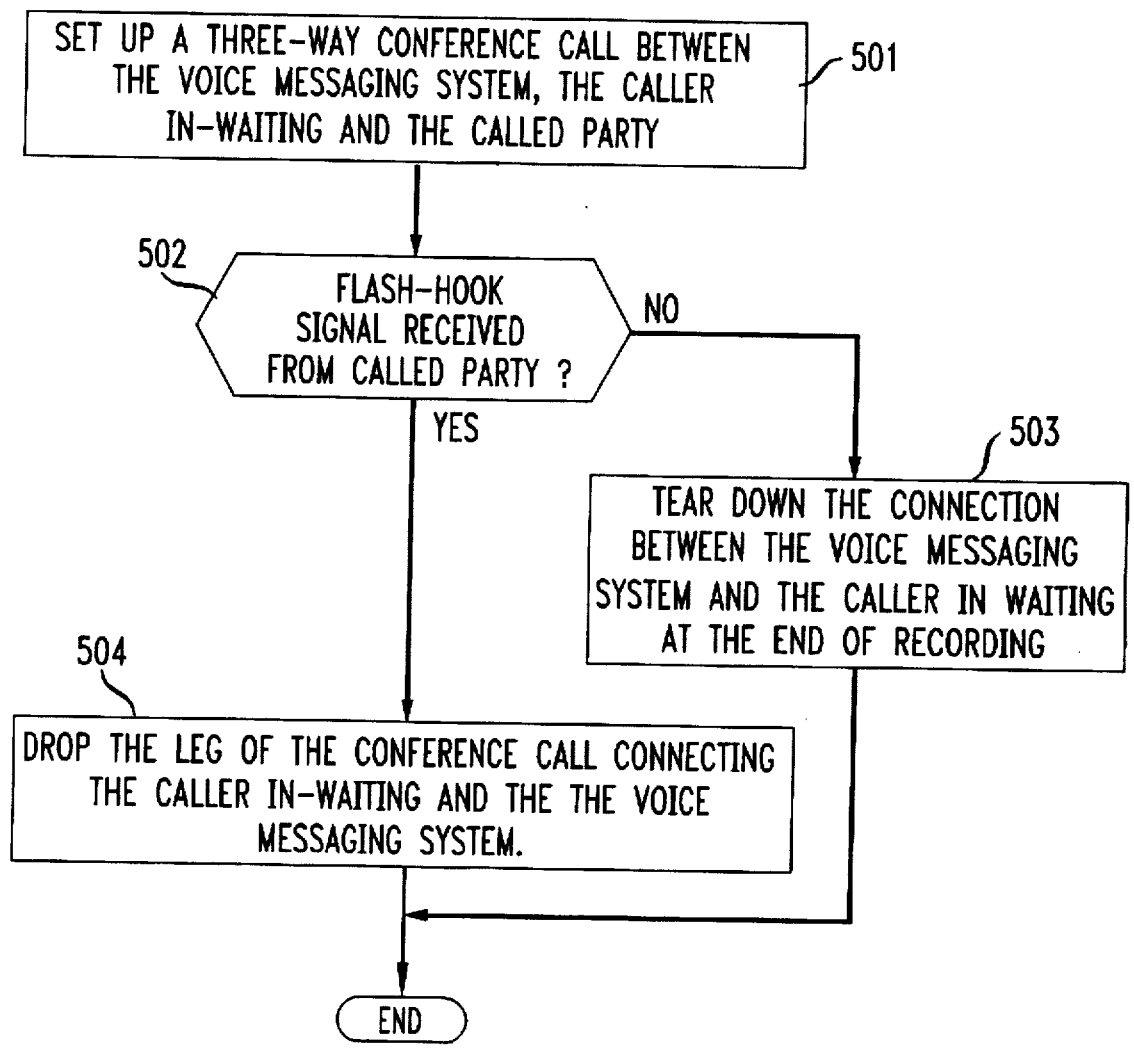

Because existing speech-to-text conversion software packages are currently designed to convert speech signals from a limited set of spoken languages to text data, processing instructions which outline an alternative embodiment of the principles of the inventive concept and which do not include speech-to-text conversion, are presented in flow diagram format in FIG. 5. When a caller-in-waiting starts recording a voice mail message, communications switch 105, in step 501, establishes a three-way conference call between voice messaging system 112, the called party and the caller-in-waiting. The three-way conference call allows the called party to eavesdrop on the message being recorded and thus to assess the importance of the call-in-waiting. The three-way conference call may take place while the first caller is placed on hold. Alternatively, the three-way conference call may take place while the first caller is still communicating to the called party. In the latter case, the speech signals from the second caller will be relayed to the called party at a lower frequency and/or at lower amplitude than the speech signals from the first caller. Communications switch 105 also mutes all speech signals from the called party to the caller-in-waiting so that the caller-in-waiting is unaware of the eavesdropping by the called party.

Optionally, communications switch 105 may drop the leg of the connection between the caller-in-waiting and voice messaging system 112 immediately after messaging system 112 has delivered a greeting announcement to the caller-in-waiting. Upon dropping the leg of the connection between the caller-in-waiting and voice messaging system 112, communications switch 105 mutes all speech signals from the called party to the caller-in-waiting. Advantageously, , voice messaging system 112 is precluded from recording a message for the called party thereby saving voice mailbox resources. Additionally, the caller-in-waiting believes that he or she is recording a message when in fact his or her message is being delivered in real-time to the called party. The called party may re-initiate recording of the speech signals uttered by the caller by providing a code, such as *49 to messaging system 112. The entry of the code reestablishes the leg of the connection between the caller-in-waiting and voice messaging system 112.

Based on the importance of the call-in-waiting, the called party may wish to communicate with the caller-in-waiting by sending a flash-hook signal to communications switch 105. If communications switch 105 receives such a signal, as determined in step 502, communications switch 105, in step 504 tears down the leg of the connection between voice messaging system 112 and the caller-in-waiting. When no flash-hook signal is received by communications switch 105, the connection for the conference call is simply dropped at the end of recording, as indicated in step 503.

The foregoing is to be construed as only being an illustrative embodiment of the principles of this invention. Persons skilled in the art can easily conceive of alternative arrangements providing functionality similar to this embodiment without any deviation from the fundamental principles or the scope of this invention.

The invention claimed is:

1. A method implemented by a communications services provider for delivering information associated with an incoming call, the method comprising the steps of:

receiving an incoming call that is initiated by a caller and that is destined for a subscriber who is busy on a first call; and in response to receiving a signal indicative of unavailability of said subscriber, recording a message generated by said caller for said subscriber;

converting speech input, associated with the message being recorded into text; and transmitting said text to said subscriber, said text being transmitted contemporaneously with the recording of the message.

2. The method of claim 1 wherein said transmission is initiated after a call waiting signal has been delivered to the caller.

3. The method of claim 2 wherein said transmission is initiated in response to receiving a request from said subscriber to effectuate said transmission.

4. The method of claim 1 wherein said text is written in a language pre-selected by the subscriber.

5. A method implemented by a communications services provider for delivering information associated with a call, the method comprising the steps of:

receiving an incoming call that is initiated by a caller and destined for a subscriber who is busy on a first call;

in response to receiving a signal indicative of unavailability of said subscriber, establishing a communications path between said caller and a messaging system which delivers a greeting announcement to said caller via said path to invite said caller to leave a message for said subscriber;

converting speech input, associated with the message into text;

establishing a one-way connection from said caller to said called party for the transmission of the text; and tearing down said communications path.

6. A system for delivering to a called party information associated with a call, the system comprising:

a communications switch which receives an incoming call initiated by a caller and destined for a called party's telephone set which is already in use for another call; and a messaging system, including a speech recognition unit, for converting a message from said caller into text and transmits said text to said communications switch coupled thereto, said message being recorded for delivery to said called party contemporaneously with said text.

7. The system of claim 1 wherein said transmission is established in response to receiving a request from said subscriber to effectuate said connection.

* * * * *